US005637339A

United States Patent [19]
Moeller

[11] Patent Number: 5,637,339
[45] Date of Patent: Jun. 10, 1997

[54] METHOD OF MAKING A TAR-DEPLETED LIQUID SMOKE

[75] Inventor: Patrick W. Moeller, Brentwood, Tenn.

[73] Assignee: Hickory Specialties, Inc., Brentwood, Tenn.

[21] Appl. No.: 429,801

[22] Filed: Apr. 27, 1995

[51] Int. Cl.⁶ .................................................. A23L 1/232
[52] U.S. Cl. ................................. 426/422; 426/492
[58] Field of Search ............................... 426/135, 422, 426/652, 492, 650

[56] References Cited

U.S. PATENT DOCUMENTS

| Re. 31,093 | 11/1982 | Tolles et al. | 252/423 |
|---|---|---|---|
| 1,753,358 | 11/1930 | Wright . | |
| 2,400,466 | 5/1946 | Reiter et al. . | |
| 3,106,473 | 10/1963 | Hollenbeck . | |
| 3,531,463 | 9/1970 | Gustafson . | |
| 3,806,609 | 4/1974 | Goblik et al. . | |
| 3,873,741 | 3/1975 | Melcer et al. . | |
| 4,112,133 | 9/1978 | Rao et al. | 426/650 |
| 4,148,753 | 4/1979 | Sarjeant | 252/422 |
| 4,154,866 | 5/1979 | Dainius et al. | 426/650 |
| 4,155,878 | 5/1979 | Tolles et al. | 252/423 |
| 4,209,647 | 6/1980 | Gallivan et al. | 568/762 |
| 4,297,220 | 10/1981 | Meltzner et al. | 210/690 |
| 4,298,435 | 11/1981 | Ledford | 201/8 |
| 4,431,032 | 2/1984 | Nicholson | 138/118.1 |
| 4,431,033 | 2/1984 | Nicholson | 138/118.1 |
| 4,496,595 | 1/1985 | Nicholson | 426/284 |
| 4,504,507 | 3/1985 | Nicholson | 426/533 |
| 4,592,918 | 6/1986 | Chiu | 426/533 |
| 4,959,232 | 9/1990 | Underwood | 426/271 |
| 4,994,297 | 2/1991 | Underwood et al. | 426/650 |
| 5,204,310 | 4/1993 | Tolles et al. | 502/416 |
| 5,206,207 | 4/1993 | Tolles | 502/424 |
| 5,250,491 | 10/1993 | Yan | 502/424 |
| 5,276,000 | 1/1994 | Matthews et al. | 502/424 |
| 5,288,532 | 2/1994 | Juhl et al. | 428/35.2 |
| 5,304,527 | 4/1994 | Dimitri | 502/425 |
| 5,324,703 | 6/1994 | McCue et al. | 502/424 |
| 5,416,056 | 5/1995 | Baker | 502/425 |

OTHER PUBLICATIONS

*The Merck Index*, Eleventh Edition, Budavari (Editor), p. 172 (1989).
Calgon Carbon Corporation, "Technical Information Activated Carbon Principles" (May, 1993).
Calgon Carbon Corporation "Activated Carbon Products for Liquid and Vapor Phase Applications" (Nov., 1993).
Calgon Carbon Corporation "Type CPG LF 12×40 Mesh Granular Carbon" (Aug., 1987).
Calgon Carbon Corporation "APA ASH Constituent Analysis" (Jun., 1990).
Calgon Carbon Corporation "APA 12×40 Acid Washed Granular Activated Carbon" (Jun., 1993).
Calgon Carbon Corporation "Defining Product Properties" (Jun., 1993).
Calgon Carbon Corporation "Glossary of Terms Commonly Used in Adsorption" (Jun., 1993).
Calgon Carbon Corporation "Processing Applications For Granular Activated Carbon" (Feb., 1986).
Calgon Carbon Corporation "The Laboratory Evaluation of Granular Activated Carbons for Liquid Phase Applications" (Jun., 1989).
Calgon Carbon Corporation "Granular Activated Carbon/ Pure & Simple" (1992).

*Primary Examiner*—Arthur L. Corbin
*Attorney, Agent, or Firm*—Richard E. Jenkins, P.A.

[57] ABSTRACT

A tar-depleted liquid smoke having total water miscibility, and related method for making same. The tar-depleted liquid smoke may be made from commercially existing liquid smoke products, for instance, by treating such a commercial product with a column filtration process using activated carbon particles packed in the column. The resultant tar-depleted liquid smoke typically will have a phenols reduction of about 10% to about 90% compared to the commercial starting product of liquid smoke. In an alternative embodiment, the tar-depleted liquid smoke made from carbon contact is then vacuum concentrated so that it has a phenols content greater than that of the commercial starting product of liquid smoke, but the concentrate will still be totally water miscible.

6 Claims, No Drawings

METHOD OF MAKING A TAR-DEPLETED LIQUID SMOKE

TECHNICAL FIELD

The present invention relates, in general, to a liquid smoke composition. Such liquid smoke compositions are used to color and flavor edible foodstuffs. More particularly, the present invention relates to a liquid smoke composition which has been refined to remove selected tar components therefrom.

BACKGROUND OF THE INVENTION

Foods have been smoked since humans first used fire to prepare meals. Smoking of foods has provided flavor, color, and preservation. Initially, preservation was the most critical reason to smoke foods, but as technology advanced, flavor and color have become the main reasons to smoke foods. As societies became more industrialized, the shift from home or individual smoking to processing in specialized plants led the need for better control of smoking procedures. Moreover, increased productivity drove the desire for more consistent smoke application techniques.

As a result, liquid smoke compositions (also known as liquid smoke solutions, and colloquially referred to as liquid smokes) were developed as a replacement for smoking of food by direct contact with smoke, and such compositions have become a standard industry practice. When applied to the surface of meats and other proteinaceous foodstuffs, such as various types of sausages, frankfurters, bolognas, beef rolls, hams, and the like, liquid smoke gives the item a characteristic smoke flavor and produces a dark smoked color. The achievement of a smokehouse-like product by application of an aqueous smoke solution to a foodstuff requires the control and balancing of many variables such as the food composition, temperature, humidity, processing time, contact time, amount of liquid smoke, and concentration of liquid smoke.

It is well known to those skilled in the art that liquid smoke compositions contain a wide array of chemical compounds, and over 400 such compounds have been identified. Nevertheless, it is also well known to those skilled in the art that liquid smoke compositions are characterized by their content of certain classes of compounds, namely, acids (% titratable acidity), phenols, and carbonyls.

The acids are preservatives, and, of course, pH control agents, as a result of which commercial liquid smoke compositions typically have a pH under about 2.5, and more typically under about 2.3, and a % titratable acidity by volume from about 3% to about 18%. The phenols give flavor, and also aroma, to liquid smoke compositions, and commercial compositions typically have a phenols content from about 3 to about 45, and more typically, from about 14 to about 30 mg/ml. The carbonyls impart the brown color to liquid smoke compositions. The phenols and the carbonyls can be measured as described in the below-mentioned U.S. Pat. No. 4,431,032 to Nicholson. The color-forming potential of liquid smoke compositions can be measured by the well-known Browning Index procedure described in the below-mentioned U.S. Pat. No. 4,994,297 to Underwood or by the well-known Staining Index procedure involving reaction of liquid smoke with glycine, as described below. It is noted that the acids and carbonyls are secondary in contributing to the flavor of liquid smoke compositions.

More specifically, liquid smoke was developed over 65 years ago, and is the aqueous condensate of natural wood smoke, as described in U.S. Pat. No. 1,753,358 issued in 1930 to Wright. Also, of interest in connection with older manufacturing procedures for liquid smoke is U.S. Pat. No. 2,400,466 issued in 1946 to Reiter et al.

Improved liquid smoke compositions and techniques for manufacture thereof are described in U.S. Pat. No. 3,106,473 to Hollenbeck, U.S. Pat. No. 3,873,741 to Melcer et al., U.S. Pat. No. 4,298,435 to Ledford, U.S. Pat. No. 4,154,866 to Dainius et al., and U.S. Pat. No. 4,994,297 to Underwood.

While the advent of liquid smoke compositions has significantly improved meat processing, attempts have been made over the last 20 years or so to deal with the tar problem of liquid smoke. Upon storage of a liquid smoke sticky, viscous precipitate on the bottom of the container for the liquid smoke.

Furthermore, although water is present in liquid smoke, it is not totally water soluble, which exacerbates the tar problem. More specifically, for commercial application of liquid smoke to a foodstuff, liquid smoke is typically diluted with water in an amount that results in 2 to 5 times the original volume of liquid smoke. However, the tar precipitate will also occur upon dilution of liquid smoke with water, and thus can easily be drawn into the piping of a system used in applying the liquid smoke to the foodstuff.

In connection therewith, it is noted that a liquid smoke composition and related process for maintaining the tar component of the liquid smoke in suspension so that the tar does not form undesirable solids during storage is described in U.S. Pat. No. 4,112,133 to Rao. More particularly, the patent to Rao is directed to admixing liquid smoke with a fatty compound, such as a polyoxyethylene sorbitan monooleate, a polyoxyethylene sorbitan monostearate, or a polyoxyethylene sorbitan monopalmitate to emulsify the tar.

Removing the tar instead of keeping it in emulsion is achieved by a solvent extraction process used on liquid smoke to create a desirable tar-depleted liquid smoke supernatant fraction and an undesirable tar-containing fraction, followed by gravity separation of the two fractions, as is described in U.S. Pat. Nos. 4,431,032, 4,431,033, and 4,496,595, all to Nicholson and in U.S. Pat. No. 4,592,918 to Chiu. Solvents such as dichloromethane or chloroform are used. Related thereto is the tar removal process described in U.S. Pat. No. 4,504,507 to Nicholson, wherein the pH of liquid smoke is raised above 4 to create a desirable tar-depleted liquid smoke supernatant fraction and an undesirable tar-containing fraction, followed by gravity separation of the two fractions.

The four patents to Nicholson also describe treating a surface of a food casing, such as a fibrous, cellulosic food casing used for sausages, with the tar-depleted liquid smoke. Furthermore, U.S. Pat. No. 5,288,532 to Juhl et al. describes a polymeric plastic film food casing, such as one made of a blend of ethylene vinyl acetate copolymer and polyethylene oxide, which during extrusion of the plastic film, has liquid smoke blended with the polymer beads. The liquid smoke then transfers, or bleeds out from the film, to the foodstuff packaged with the film.

Lastly, of interest in relation to removal of undesired components from liquid smoke is the process described in U.S. Pat. No. 4,959,232 to Underwood, which is directed to passing liquid smoke through a column of both ionic and non-ionic polymeric resin beads (suitable resins are copolymers of alkylacrylates and cross-linking polyvinylidene), or alternatively mixing the liquid smoke with the resin beads in a batch process, to remove flavor components thereof so that more of the resultant liquid smoke can be employed to impart more of the brown coloring to the treated foodstuff.

The disclosures of all of the above-mentioned patents are incorporated herein by reference.

Despite the above-discussed procedures to deal with removing or keeping suspended certain components of liquid smoke (such as removing tar by solvent extraction of liquid smoke or keeping tar in suspension by adding a sorbitan fatty compound to liquid smoke), nevertheless, problems still exist with such procedures. For instance, the solvent extraction process of the patents to Nicholson and the resin treatment process of the patent to Underwood both have a shortfall in that these processes leave residual solvents that are directly added by Nicholson or used by Underwood to condition the resin.

Keeping the tar suspended in accordance with the process of the patent to Rao requires addition of sorbitan fatty compounds which dilutes the liquid smoke, resulting not only in increased usage requirements but also impeding the color-forming reaction whereby the smoke can be rinsed away from the foodstuff if not properly set during application to the foodstuff. With this process, the tar is still in the liquid smoke so that the tar, as well as the added sorbitan fatty compound, is being eaten by the consumer of the smoke-treated foodstuff. Moreover, sorbitan fatty compounds have not been approved for application to foodstuffs in some countries, which limits the distribution of these smoke-treated foodstuffs.

Thus, it is desirable to find an improved liquid smoke composition that is tar-depleted and a method for the manufacture thereof, which composition and method obviate the above-mentioned problems.

SUMMARY AND OBJECTS OF THE INVENTION

Accordingly, the present invention provides a method for making a tar-depleted liquid smoke composition comprising the step of contacting a starting-material liquid smoke composition having a phenols content, the phenols content including a tar component, with an activated carbon having sufficient active sites to produce a tar-depleted liquid smoke composition having a phenols content with a reduced tar component such that the tar-depleted liquid smoke is totally water miscible.

Additionally, the present invention provides for a tar-depleted liquid smoke composition comprising a totally water-miscible tar-depleted liquid smoke composition, the tar-depleted liquid smoke composition being derived from a starting-material liquid smoke composition containing phenols, the phenols including a tar component, wherein the phenols of the tar-depleted liquid smoke composition has a reduced tar component from contacting the starting-material liquid smoke composition with an activated carbon having sufficient sites to produce the reduction.

Preferably, the starting material liquid smoke composition has a phenols content of about 3 to about 45, and more preferably, about 14 to about 30 mg/ml. Typically, the phenols content of the resultant tar-depleted liquid smoke composition will be reduced by about 10% by weight to about 90% by weight, as compared to the phenols content of the liquid smoke composition starting material.

However, in an alternative embodiment, the tar-depleted liquid smoke may be concentrated, such as by vacuum evaporation, and the concentrate will have a phenols content higher than that of the liquid smoke composition starting material but still will be totally water miscible.

The present invention also contemplates a food casing treated with the tar-depleted liquid smoke composition. The treatment may be by spraying the tar-depleted liquid smoke onto a surface of the casing, or in the event that the casing is of extruded polymeric plastic film, the tar-depleted liquid smoke may be sprayed onto a surface of the film or may be incorporated into the extruder with the polymeric resin beads and thus blended into the resultant plastic film.

The present invention also contemplates a proteinaceous foodstuff, such as various types of sausages, frankfurters, bolognas, beef rolls, hams, and the like, treated with the novel tar-depleted liquid smoke composition.

Accordingly, it is an object of the present invention to provide a liquid smoke composition and related method of manufacture, wherein the composition is tar-depleted and therefore will not form tar precipitate upon dilution with water.

Hence, it is an advantage of the present invention that the liquid smoke composition is totally water miscible since when liquid smoke is applied to foodstuffs or food casings it is typically diluted with water and forms tar precipitates that gum the piping system of the application apparatus, which gumming will not occur with the tar-depleted liquid smoke composition of the present invention.

Some of the objects and advantages of the invention having been stated above, other objects, as well as other advantages, will become evident as the description proceeds, when taken in conjunction with the Laboratory Examples and detailed description hereinbelow.

DETAILED DESCRIPTION OF THE INVENTION

The present invention is directed to a tar-depleted liquid smoke composition manufactured by contacting liquid smoke with activated carbon having sufficient active sites to reduce the tar component of liquid smoke. While it is not intended to be bound to any theory, it is believed that the tar component is part of the phenols component of liquid smoke, as further explained below. The tar-depleted liquid smoke composition of the invention still retains smoke coloring and smoke flavoring capability.

As can be seen from the Laboratory Examples below, the inventive method resulted in a reduction of the phenols in the resultant liquid smoke as compared to the starting material liquid smoke. When the resultant was then diluted with water, no tar precipitated. Rather, the diluted liquid smoke remained clear from a dilution with water of up to 5 times the original volume of the resultant, and thus the resultant was totally miscible with water.

In an alternative embodiment, when the resultant was concentrated by vacuum evaporation to remove some of the water thereof, the concentrate had a phenols content higher than that of the starting material liquid smoke. However, the concentrate, upon dilution with water of up to 5 times, still remained clear. (See sample no. 4 of Example 4 below.)

Moreover, with certain activated carbons that have insufficient active sites, although the phenols content was lower in the resultant than in the starting material liquid smoke, the resultant still was tar-containing. (See Example 5 below.) Thus, for those activated carbons with sufficient active sites, it appears that the inventive method reduces the phenols by reducing the tar component thereof.

In selected Laboratory Examples below, in order to produce a tar-depleted liquid smoke, a tar-containing liquid smoke thus treated by the method of the present invention was Code 10, which is commercially available from Hickory Specialties, Inc., of Brentwood, Tenn. In one of the Laboratory Examples below, the liquid smoke starting material employed was SUPERSMOKE, also commercially available from Hickory Specialties, Inc., and manufactured by a well known vacuum evaporation process that concentrates Code 10 by removing some of the water thereof. As a result, SUPERSMOKE has a typical acidity of about 16%, whereas Code 10 has a typical acidity of about 11%. Other commercially available liquid smoke compositions also may be employed with the method of the present invention to produce a tar-depleted liquid smoke.

Each of the activated carbon products useful in the present invention for treating the liquid smoke starting material, such as Code 10, has sufficient active sites in the carbon particles to produce a tar-depleted liquid smoke composition having a phenols content with a reduced tar component such that the tar-depleted liquid smoke is totally water miscible. As compared to the liquid smoke starting material, the tar-depleted liquid smoke typically has a phenols content reduced by at least about 10% by weight, and the reduction may be up to about 90% by weight, but more typically is up to about 85% by weight. Preferably, the reduction is at least about 15% by weight, and more preferably at least about 30% by weight. In connection therewith, it is reiterated that the tar-depleted liquid smoke may be concentrated by the vacuum evaporation process (the process noted above for making SUPERSMOKE from Code 10 and well known to those skilled in the art), and hence, the concentrate will be tar-depleted but have a phenols content higher than that of the liquid smoke starting material.

The activated carbon products having sufficient active sites and employed in the present invention were purchased from Calgon Carbon Corporation of Pittsburgh, Pa., and are described in their sales brochure entitled "Activated Carbon Products for Liquid and Vapor Phase Applications" (November, 1993). The preferred activated carbon having sufficient active sites for use in the present invention is sold by Calgon under the trade name ADP, and is pulverized with a U.S. standard sieve size of 80×325. Less preferred is the activated carbon having sufficient active sites and sold by Calgon under the trade name APA, which is granular and has a U.S. standard sieve size of 12×40. Also useful, but much less preferred because either much more must be used or the contact time with the commercially available liquid smoke must be much longer, is an activated carbon having sufficient active sites and sold by Calgon under the trade name PWA, which is pulverized. Calgon does not indicate in their sales brochure what is the U.S. standard sieve size of PWA, but has made publicly known that PWA is not as highly activated as either APA or ADP.

Any carbon having sufficient active sites or mixtures of such carbons may be employed in the present invention. Therefore, an activated carbon having sufficient active sites may be selected from the group consisting of ADP, APA, PWA, and combinations thereof. In connection therewith, it is noted that certain activated carbons do not have sufficient active sites and do not work in the present invention. One such activated carbon with insufficient active sites is sold under the trade name TOG by Calgon, and is further described in Example 5 below.

As described in their technical information brochure entitled "Activated Carbon Principles" (May, 1993), Calgon manufactures activated carbon by treating such materials as coal, wood, peat, coconut shells, and petroleum coke with a heat and steam process, resulting in graphite platelets. As explained in their brochure, part of the material is selectively oxidized with an acid gas mixture of water vapor and carbon dioxide to develop a certain pore structure, i.e., create active sites. More particularly, the amount of activation is related to the resultant pore volume of the activated carbon, which affects the Van der Waals force that fixes the products to be adsorbed to the activated carbon.

With the present invention, the contact of the liquid smoke with the activated carbon in order to produce tar-depleted liquid smoke should be under ambient conditions of temperature and pressure. Furthermore, the time of contact should be about at least 15 minutes, and may be up to about 12 hours or more, depending on the particular type, amount, and pore volume of the activated carbon employed. More preferably, the contact time should be about 0.5 hours to about 9 hours, and most preferably about 1.50 hours to about 5 hours.

Batch processes, wherein the activated carbon particles are placed in liquid smoke in a container with stirring, followed by filtration to separate the particles from the resultant tar-depleted liquid smoke, may be employed. Besides filtration, the method to separate the particles may include gravity decanting, liquid cycloning, and centrifugal decanting. However, in a commercial setting in a factory, a column process should be more economically viable. In a column process, a cylindrical container is packed with a bed of the activated carbon particles, and then the liquid smoke is passed downflow through the column, and effluent of tar-depleted liquid smoke is collected as it exits the bottom of the column.

The activated carbon particles useful in the present invention adsorb phenols (including the tar-producing components thereof) from the starting-material liquid smoke, and the bound phenols can be displaced from the spent activated carbon particles under appropriate conditions. The removal of adsorbates, such as by backwash, from spent activated carbon particles is well known to those skilled in the art, and will allow the carbon to be reused and recycled.

As noted above, food casings may be treated with the tar-depleted liquid smoke composition. In the event that the casing is the fibrous type, the treatment may be by spraying the tar-depleted liquid smoke onto a surface of the casing. Typical fibrous casings are cellulosic in nature. In the event that the casing is of extruded polymeric plastic film, the tar-depleted liquid smoke may be sprayed onto the surface of the film. Alternatively, the tar-depleted liquid smoke may be incorporated into the extruder with the polymeric resin beads and thus blended into the resultant plastic film. Typical polymeric plastic films include, but are not limited to, films of polymers selected from the group consisting of ethylene vinyl acetate, ethylene acrylic acid, ethylene methacrylic acid, linear low density polyethylene, very low density linear low density polyethylene (sometimes referred to as ultra low density polyethylene), and combinations thereof.

Additionally, a proteinaceous foodstuff may be treated with the tar-depleted liquid smoke composition, such as by spraying on the surface thereof. Examples of various types of proteinaceous foodstuffs include, but are not limited to, sausages, frankfurters, bolognas, beef rolls, hams, and combinations thereof.

LABORATORY EXAMPLES

In the Laboratory Examples below, the methods used to determine the phenols and the carbonyls are well known to those skilled in the art and are set out at columns 11 and 12 in the above-mentioned U.S. Pat. No. 4,431,032 to Nicholson. Also, in the Laboratory Examples below, the methods used to determine the staining index and the acid percent are well known to those skilled in the art, and are set out as follows:

STAINING INDEX

Reagent of 2.5% Glycine in 95% Acetic Acid. Slurry 2.50 gram of glycine (Eastman #445) with 5.0 ml distilled water in a 150 ml beaker. Add about 70 ml glacial acetic and heat on a steam bath, stirring occasionally to dissolve the glycine. Transfer to a 100 ml volumetric flask, cool to room temperature, and make to volume with glacial acetic acid which is used to rinse the original beaker. Filter the solution prior to use if any glycine crystallizes out. The solution is stable for at least 3 weeks, and probably indefinitely.

5% Liquid Smoke Solution. Dilute 2.50 ml of liquid smoke to 50.0 ml with glacial acetic acid.

Reaction:

1. Using two 25 ml graduated test tubes, add 1.0 ml of the 5% liquid smoke solution to 10.0 ml of glycine reagent and add 1.0 ml of the 5% liquid smoke solution to 10 ml of glacial acetic acid (blank).
2. Cover each tightly with a square of parafilm, and mix by swirling and place in a water bath at 85° C. for 30 minutes.
3. Transfer to a cold water bath and dilute partially with distilled water to speed cooling. When at room temperature, finish diluting to the 25 ml mark and mix by inversion.
4. Set a spectrophotometer to 0 using distilled water. Read the absorbance of each solution in a 0.5 inch cuvette using a spectrophotometer at 440 millimicrons.
5. Calculate the net absorbance by subtracting the reading of the blank (consisting of 1.0 ml of 5% liquid smoke solution, 10.0 ml glacial acetic acid, and distilled water to 25 ml) from the reading of the test sample.
6. Calculate the staining index: SI=Net Absorbance ×100.

PERCENTAGE OF ACETIC ACID

Pour 250 ml of distilled water into a clean 400 ml beaker. Introduce 6 ml of liquid smoke. Standardize pH meter with pH 7 buffer solution. The pH meter should be on 7.00. If not, use control knob and place it there. Rinse off glass electrode with distilled water from spray bottle. Place beaker of water-smoke mixture on testing platform, and lower pH electrodes. Stir mixture, adding in standard 1.0 Normality sodium hydroxide solution. Add the sodium hydroxide until pH meter reads 7.00. The amount of milliliters of sodium hydroxide put into the water-smoke mixture is the percentage of acetic acid. For instance, 1 ml of sodium hydroxide entering into the smoke-water mixture will count 1 point acetic acid until the pH meter reaches a value of 7.00. In other words, if 9.4 ml of 1.0N sodium hydroxide solution is introduced, the acetic acid reading will be 9.4% of acetic acid by volume. The calculations are as follows:

% acetic acid=[(ml of NaOH)×(Normality of NaOH)× (equivalent weight of acetic acid)] divided by ml of liquid smoke.

% acetic acid=[(11.3 ml of NaOH)×(1.0 Normality)× (approximately 60)] divided by 6.0 ml of liquid smoke, and thus, % acetic acid=11.3.

Example 1

(column)

A cylindrically shaped, metal, 55 gallon drum of about 22.5 inches (about 57 cm) in diameter and about 34 ⅜ inches (about 87 cm) in height was fitted with a bottom drain port and a top feed tube. Into the drum was placed about 160 pounds [about 352 kg, which was a column height of about 28 inches (about 71 cm)] of APA, a granular acid-washed activated carbon from Calgon.

Liquid smoke having a titratable acidity of 11.0% (about 30 gallons of Code 10 from Hickory Specialties, Inc.) was fed into the drum and allowed to sit overnight (about 12 hours), and the resultant tar-depleted effluent drained from the bottom port of the drum is designated in Table 1 below as the 1st sample. On the following day, a continuous gravity feed of Code 10 was initiated via the top feed tube and drained via the bottom port. Flow rate through the drum was 30 gallons per hour, which was a contact time of about 2 hours. The effluent liquid smoke samples were collected sequentially in 55 gallon drums, and are designated in Table 1 below as the 2nd, 3rd, 4th, 5th, 6th and 7th samples. The samples were analyzed with the following results reported in Table 1 below:

TABLE 1

| Sample | Acidity (%) | pH | Staining Index | Carbonyls (g/100 g) | Phenols (mg/ml) | Water Dilution | Specific Gravity |
| --- | --- | --- | --- | --- | --- | --- | --- |
| Code 10 feed | 11.0 | 2.11 | 90.0 | 22.9 | 18.7 | Cloudy | 1.077 |
| 1st | 8.7 | 1.97 | 58.6 | 11.2 | 2.7 | Clear | 1.050 |
| 2nd | 11.5 | 2.01 | 91.8 | 20.3 | 6.3 | Clear | 1.079 |
| 3rd | 11.2 | 2.05 | 98.0 | 19.6 | 10.0 | Clear | 1.080 |
| 4th | 10.9 | 2.05 | 98.1 | 20.6 | 16.6 | Clear | 1.082 |
| 5th | 10.8 | 2.05 | 93.5 | 20.3 | 16.3 | Clear | 1.082 |
| 6th | 10.8 | 2.06 | 87.8 | 20.3 | 19.0 | Slightly Cloudy | 1.082 |
| 7th | 10.9 | 2.06 | 91.3 | 20.3 | 17.1 | Cloudy | 1.082 |

For water dilution, water was added to create a 2× volume for all samples. The Code 10 feed sample exhibited cloudiness (i.e., tar precipitate) from the dilution, which was expected as Code 10 is a commercially available tar-containing liquid smoke.

For the 2nd through 5th samples, water to a 2× volume did not result in tar precipitate and thus more water was added to create a 5× volume. Still the samples remained clear, which illustrates these tar-depleted samples were totally water miscible. Furthermore, the data clearly shows a reduction in total phenolic compounds which parallels the water miscibility, for each of the 1st through 5th samples. Consequently, a blend of the 1st through 5th samples should be efficacious as a tar-depleted liquid smoke having staining properties essentially the same as the starting material. Also, each of the 1st through 5th samples could be used individually for treating a foodstuff, depending on the desired flavor and browning.

Thereafter, for the 6th and 7th samples, the activated carbon particles were apparently spent and should be backwashed to remove adsorbates since the phenols % was about the same as that of the starting Code 10 feed and only a 2× water dilution resulted in cloudiness.

Example 2

(batch)

The impact of carbon particle size on the effectiveness in generating tar-depleted liquid smoke was evaluated using powdered and granular forms of the same activated carbon. Carbon APA from Calgon is a granular form of highly activated carbon while ADP from Calgon is a powdered form of the same material.

To equal aliquots (100 ml) of Code 10 liquid smoke (10.7% titratable acidity) was added each of the activated carbons in various amounts. The samples were mixed with a magnetic stirrer for the time intervals indicated in Table 2 below, and at those times, small (1 ml) portions were taken and filtered through a Whatman #1 filter paper to remove the carbon.

Each filtered sample of liquid smoke was mixed with 2 to 5 times its volume of water to judge miscibility. The lack of tar or precipitate formation for 2 hours (sample remained clear) was established as the endpoint in determining that the sample was totally water miscible, and those are reported in Table 2 below.

The following Table 2 shows the similarity in minimum carbon levels necessary to achieve a tar-depleted liquid smoke with total water miscibility, and highlights the increased carbon required to achieve miscibility at shorter contact times for granular carbon as compared to powdered carbon. The differential in carbon amounts for shorter time periods is proportional to the adsorption rate of tar-forming components to internal active sites in the carbon matrix.

TABLE 2

Granular vs. Powder Carbon Comparison

| Type of Carbon | Amount of Carbon (grams) | Contact Time of Magnetic Stirring (hours) |
|---|---|---|
| APA | 15 | 0.75 |
|  | 12.5 | 1.25 |
|  | 10 | 1.7 |
|  | 8 | 3 |
|  | 5.25 | 4.25 |
|  | 4 | 8 |
| ADP | 8 | 1.5 |
|  | 5 | 5.25 |
|  | 4 | 8.5 |

As can be seen, the powdered ADP had more active sites on its surface than the granular APA, since 8 grams of powdered ADP produced tar-depleted liquid smoke with 1.5 hours of contact time, whereas to produce tar-depleted liquid smoke in about the same amount of time, 10 grams (1.25 hours) to 12.5 grams (1.75 hours) of granular APA were required.

Example 3

(batch)

The impact of the amount of carbon activation on production of totally water miscible smoke was evaluated using Calgon powdered carbons ADP and PWA. These two carbons are derived from the same source materials but Calgon reports that they differ in amount of activation with ADP having a higher activation level.

The procedure of Example 2 was repeated and different levels of carbon were mixed with 100 ml aliquots of Code 10 liquid smoke (10.7% titratable acidity). It was found that the more activated a given carbon, the greater the efficiency of removing tar-forming materials. The results are reported in the following Table 3 which shows the significant impact of activation level on carbon efficiency.

TABLE 3

Carbon Powder Comparison

| Type of Carbon | Amount of Carbon (grams) | Contact Time of Magnetic Stirring (hours) |
|---|---|---|
| ADP | 8 | 1.5 |
|  | 5 | 5.25 |
|  | 4 | 8.5 |
| PWA | 15 | 0.25 |
|  | 12.5 | 1.0 |
|  | 8 | 8.5 |

As can be seen, 8 grams of the more activated powdered ADP produced tar-depleted liquid smoke with only 1.5 hours of contact time, whereas the same amount of 8 grams of the less activated powdered PWA took 8.5 hours to produce tar-depleted liquid smoke.

Example 4

(column)

The following Table 4a depicts the products used to produce tar-depleted liquid smokes of different concentrations, employing the column procedure of Example 1 with Calgon activated carbon APA, except that the column was continuous by linking 6 drums together. The flow rate was 2 gallons/minute through a total of about 810 pounds of carbon for all 6 drums (i.e., 135 pounds/drum). To determine water miscibility, the effluent was diluted with water to 5× the previous volume.

TABLE 4a

Commercially Existing Products (1) Code 10 (basic liquid smoke)

(2) SUPERSMOKE (smoke concentrate)

Products of Invention (3) Tar-depleted (resultant from carbon treatment of Code 10)

(4) Tar-depleted concentrate (made from using on no. 3 the same vacuum evaporation process as is used commercially to make SUPERSMOKE from Code 10)

(5) Tar-depleted (resultant from Carbon treatment of SUPERSMOKE)

The composition of each of these products is defined in the following Table 4b with products identified by the number in parenthesis.

TABLE 4b

| Test Parameter | Product | | | | |
|---|---|---|---|---|---|
|  | (1) | (2) | (3) | (4) | (5) |
| Titratable Acidity (%) | 10.9 | 16.2 | 11.1 | 16.95 | 17.9 |
| Staining Index | 102.3 | 201.8 | 88.7 | 217.2 | 232.6 |
| Specific Gravity | 1.080 | 1.168 | 1.074 | 1.172 | 1.176 |
| Carbonyls (g/100 ml) | 22.1 | 39.5 | 20.4 | 36.9 | 36.3 |
| Phenols (mg/ml) | 17.6 | 28.4 | 9.1 | 23.6 | 16.8 |
| Water Solubility | No | No | Yes | Yes | Yes |

It is readily apparent that various products can be derived through alternative pathways. Specifically, the efficacy of activated carbons in producing totally water-miscible smoke products is not impacted by concentration of tar-depleted Code 10 (product no. 3) to create tar-depleted SUPERSMOKE concentrate (product no. 4), as compared making tar-depleted SUPERSMOKE (product no. 5) directly by carbon treatment of commercial SUPERSMOKE (product no. 2). Thus, product no. 4 has a phenols content greater than that of the starting material, namely product no. 1, but product no. 4 is still totally water miscible, as it is tar-depleted.

Example 5

(comparison)

The impact of an activated carbon with insufficient active sites to produce a tar-depleted liquid smoke was evaluated using Calgon activated carbon TOG.

The batch procedure of Example 2 was repeated and different gram levels of carbon (reported as g of C) were mixed with 100 ml aliquots of liquid smoke (11% titratable acidity) for 3 hours, followed by filtration to remove the carbon particles. Each of the resultant carbon-treated liquid smoke samples was mixed with 2 times its volume of water to judge miscibility. All water-diluted samples were tar-containing as tar precipitate always formed within 2 hours and the samples were cloudy.

It was found that although at a level of ≥2.5 g of the activated carbon, the carbon reduced the phenols content of each carbon-treated liquid smoke sample, the active sites were insufficient for removing tar-forming materials from the phenols. Further in connection with the phenols content of the carbon-treated liquid smoke samples, it is noted that at a level from 0.05 g to 1.0 g of carbon, the carbon reduced the phenols content of each carbon-treated liquid smoke sample only by a de minimus amount (i.e., <1%) or actually increased the phenols content or each carbon-treated liquid smoke sample.

Moreover, for those samples treated at a level of ≥2.5 g of the activated carbon, wherein the carbon reduced the phenols content, there is also a positive correlation of the pH of the sample increasing, which, as can be seen from reviewing Table 1, did not occur from treatment with Calgon carbon APA.

The results are reported in the following Table 5 which shows the significant impact of lack of sufficient activation sites on carbon ability for removal of the tar-component of the phenols.

Example 2 (all samples of Table 2), Example 3 (all samples of Table 3), and Example 4 (samples 3, 4 and 5), and with these liquid smokes diluted with water up to 5×.

The foodstuffs thus treated by applying the tar-depleted liquid smokes to the surface thereof are sausages, frankfurters, beef rolls, hams, and bolognas.

Excellent staining and flavor is obtained.

Example 7

(Treatment of Food Casings).

Food casings are treated with the tar-depleted liquid smokes from Example 1 (samples 1 through 5), Example 2 (all samples of Table 2), Example 3 (all samples of Table 3), and Example 4 (samples 3, 4, and 5), and with these liquid smokes diluted with water up to 5×.

Selected casings are cellulosic fibrous casings and are treated by spraying the tar-depleted liquid smokes onto the surface thereof.

Selected casings are extruded polymeric plastic films and are treated by spraying the tar-depleted liquid smokes onto the surface thereof.

Selected casings are extruded polymeric plastic films and are treated by incorporating the tar-depleted liquid smokes into the extruder with the polymeric resin beads and thus blending the smokes into the resultant films.

The polymeric plastic films are of ethylene vinyl acetate, ethylene acrylic acid, ethylene methacrylic acid, linear low density polyethylene, and very low density linear low density polyethylene.

The foodstuffs of Example 6 are packaged with the various casings, and the packaged foodstuffs have excellent staining and flavor.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for making a tar-depleted liquid smoke composition consisting essentially of the step of contacting a starting-material liquid smoke composition having a phenols content, the phenols content including a tar component, the contacting being for a sufficient amount of time with a sufficient amount of an activated carbon having sufficient active sites to produce a totally water miscible, tar-depleted liquid smoke composition having a phenols content with a reduced tar component.

2. The method of claim 1, wherein contacting occurs for a time from about 15 minutes to about 12 hours.

TABLE 5

| Sample g of C | Acidity (%) | pH | Staining Index | Carbonyls (g/100 g) | Phenols (mg/ml) | Water Dilution | Tar Settled |
| --- | --- | --- | --- | --- | --- | --- | --- |
| Code 10 feed (none) | 11.0 | 2.01 | 88.4 | 15.8 | 14.05 | Cloudy | Yes |
| 0.05 | 11.2 | 2.02 | 85.3 | 14.5 | 16.13 | Cloudy | Yes |
| 0.1 | 11.15 | 2.02 | 85.5 | 15.7 | 13.94 | Cloudy | Yes |
| 0.2 | 11.0 | 2.04 | 84.0 | 14.4 | 16.20 | Cloudy | Yes |
| 0.5 | 11.2 | 2.05 | 80.6 | 15.8 | 13.24 | Cloudy | Yes |
| 1.0 | 11.0 | 2.07 | 80.0 | 15.1 | 16.51 | Cloudy | Yes |
| 2.5 | 11.0 | 2.19 | 81.3 | 15.7 | 11.73 | Cloudy | Yes |
| 5.0 | 10.75 | 2.30 | 83.7 | 14.8 | 10.69 | Cloudy | Yes |
| 10.0 | 10.8 | 2.47 | 83.7 | 13.9 | 9.23 | Cloudy | Yes |

Example 6

(Treatment of Foodstuffs)

Proteinaceous foodstuffs are treated with the tar-depleted liquid smokes from Example 1 (samples 1 through 5), 3. The method of claim 1, wherein the starting-material liquid smoke composition has a phenols content of about 3 to about 45 mg/ml.

4. The method of claim 1, wherein the activated carbon having sufficient active sites is selected from the group consisting of ADP, ADP, PWA, and combinations thereof.

5. The method of claim 1, wherein the tar-depleted liquid smoke composition has a phenols content reduced from about at least 10% by weight up to about 90% by weight.

6. The method of claim 1, further including the step of concentrating the tar-depleted liquid smoke composition by subjecting the tar-depleted liquid smoke composition to vacuum evaporation, whereby the concentrated tar-depleted liquid smoke composition has a higher phenols content than that of the starting-material liquid smoke composition.

* * * * *